(12) United States Patent
Soejima et al.

(10) Patent No.: US 11,105,657 B2
(45) Date of Patent: Aug. 31, 2021

(54) OPTICAL INSPECTION SYSTEM, OPTICAL INSPECTION METHOD, AND AIRCRAFT STRUCTURE

(71) Applicant: SUBARU CORPORATION, Tokyo (JP)

(72) Inventors: Hideki Soejima, Tokyo (JP); Toshimichi Ogisu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 146 days.

(21) Appl. No.: 16/373,965

(22) Filed: Apr. 3, 2019

(65) Prior Publication Data

US 2019/0368904 A1 Dec. 5, 2019

(30) Foreign Application Priority Data

May 30, 2018 (JP) .............................. JP2018-103821

(51) Int. Cl.
*G01D 5/353* (2006.01)
*G01N 21/45* (2006.01)

(52) U.S. Cl.
CPC ..... *G01D 5/35338* (2013.01); *G01D 5/35316* (2013.01); *G01N 21/45* (2013.01)

(58) Field of Classification Search
CPC . G01D 5/35338; G01D 5/35316; G01N 21/45
See application file for complete search history.

(56) References Cited

U.S. PATENT DOCUMENTS

2007/0200057 A1 8/2007 Ogisu et al.
2008/0043243 A1* 2/2008 Lee .................... G01M 11/083
356/477

(Continued)

FOREIGN PATENT DOCUMENTS

| JP | 2005257624 A | * | 9/2005 |
| JP | 2007-232371 A | | 9/2007 |
| JP | 2014-153094 A | | 8/2014 |

OTHER PUBLICATIONS

Kojima et al., "High-speed optical wavelength interrogator using a PLC-type optical filter for fiber Bragg grating sensors", SPIE's International Symposium on Smart Structure and Materials, Proceedings of SPIE, vol. 5384, pp. 241-249, 2004.*

(Continued)

*Primary Examiner* — Thanh Luu
(74) *Attorney, Agent, or Firm* — Smith, Gambrell & Russell, LLP (57) ABSTRACT

An optical inspection system includes an optical fiber sensor, an optical filter, a signal processor, and a corrector. The optical fiber sensor outputs a first optical signal having a temporal change in a wavelength corresponding to a temporal change in an amplitude of a vibration propagating in an inspection target object or a temporal change in a displacement of the inspection target object. The optical filter converts the first optical signal into a second optical signal having a temporal change in an intensity. The signal processor acquires inspection information on the inspection target object on the basis of the second optical signal. The corrector corrects a correspondence relationship between the temporal change in the wavelength and the temporal change in the intensity by changing a wavelength characteristic of the optical filter. The correspondence relationship is directed to converting the first optical signal into the second optical signal.

20 Claims, 7 Drawing Sheets

(56) References Cited

U.S. PATENT DOCUMENTS

| | | | |
|---|---|---|---|
| 2008/0106745 A1* | 5/2008 | Haber | G01L 1/242 356/519 |
| 2009/0238513 A1 | 9/2009 | Hao et al. | |
| 2012/0321242 A1 | 12/2012 | Schade et al. | |
| 2014/0218751 A1 | 8/2014 | Soejima et al. | |
| 2014/0330528 A1 | 11/2014 | Soejima et al. | |

OTHER PUBLICATIONS

European Search Report dated Oct. 28, 2019 for European Patent Application No. 19171195.1 (9 pages).

* cited by examiner

OPTICAL INSPECTION SYSTEM, OPTICAL INSPECTION METHOD, AND AIRCRAFT STRUCTURE

CROSS-REFERENCE TO RELATED APPLICATIONS

The present application claims priority from Japanese Patent Application No. 2018-103821 filed on May 30, 2018, the entire contents of which are hereby incorporated by reference.

BACKGROUND

Implementations of the technology relate to optical inspection systems, optical inspection methods, and aircraft structures.

To date, techniques are known for measuring physical quantities, such as an amount of strain, with the use of a fiber Bragg grating (FBG). Specifically, there is proposed a system that searches for any damage in a composite material used for an aircraft with the use of an FBG and an arrayed waveguide grating (AWG) (see, for example, Japanese Unexamined Patent Application Publication (JP-A) No. 2007-232371). More specifically, there is proposed a system that detects, with an FBG sensor serving as a sensor for an ultrasonic wave emitted from a piezoelectric element, damage on the basis of a change in the waveform of the ultrasonic wave detected by the FBG sensor.

There is also proposed a technique for measuring a slight displacement produced in an object with high sensitivity with the use of a phase-shifted FBG (PS-FBG) serving as an ultrasonic wave sensor (see JP-A No. 2014-153094, for example).

SUMMARY

An aspect of the technology provides an optical inspection system including: an optical fiber sensor configured to detect a vibration propagating in an inspection target object or a displacement of the inspection target object and to output a first optical signal having a temporal change in a wavelength, the temporal change in the wavelength corresponding to a temporal change in an amplitude of the vibration or a temporal change in the displacement; an optical filter configured to convert the first optical signal into a second optical signal having a temporal change in an intensity and to output the second optical signal, the temporal change in the intensity corresponding to the temporal change in the wavelength; a signal processor configured to acquire inspection information on the inspection target object on a basis of the second optical signal; and a corrector configured to correct a correspondence relationship between the temporal change in the wavelength of the first optical signal and the temporal change in the intensity of the second optical signal by changing a wavelength characteristic of the optical filter, the correspondence relationship being directed to converting the first optical signal into the second optical signal.

An aspect of the technology provides an aircraft structure including the optical inspection system described above.

An aspect of the technology provides an optical inspection method including acquiring inspection information of an inspection target object by the optical inspection system described above.

An aspect of the technology provides an aircraft structure including an optical inspection system. The optical inspection system includes: an optical fiber sensor configured to detect a vibration propagating in an inspection target object or a displacement of the inspection target object and to output a first optical signal having a temporal change in a wavelength, the temporal change in the wavelength corresponding to a temporal change in an amplitude of the vibration or a temporal change in the displacement; an optical filter configured to convert the first optical signal into a second optical signal having a temporal change in an intensity and to output the second optical signal, the temporal change in the intensity corresponding to the temporal change in the wavelength; a signal processor configured to acquire inspection information on the inspection target object on a basis of the second optical signal; and a corrector configured to correct a correspondence relationship between the temporal change in the wavelength of the first optical signal and the temporal change in the intensity of the second optical signal by changing a wavelength characteristic of the optical filter, the correspondence relationship being directed to converting the first optical signal into the second optical signal.

An aspect of the technology provides an optical inspection method including: detecting, with an optical fiber sensor, a vibration propagating in an inspection target object or a displacement of the inspection target object and outputting a first optical signal having a temporal change in a wavelength, the temporal change in the wavelength corresponding to a temporal change in an amplitude of the vibration or a temporal change in the displacement; converting, with an optical filter, the first optical signal into a second optical signal having a temporal change in an intensity corresponding to the temporal change in the wavelength and outputting the second optic al signal; acquiring inspection information on the inspection target object on a basis of the second optical signal; and correcting a correspondence relationship between the temporal change in the wavelength of the first optical signal and the temporal change in the intensity of the second optical signal by changing a wavelength characteristic of the optical filter, the correspondence relationship being directed to the converting the first optical signal into the second optical signal.

An aspect of the technology provides an optical inspection system including: an optical fiber sensor configured to detect a vibration propagating in an inspection target object or a displacement of the inspection target object and to output a first optical signal having a temporal change in a wavelength, the temporal change in the wavelength corresponding to a temporal change in an amplitude of the vibration or a temporal change in the displacement; an optical filter configured to convert the first optical signal into a second optical signal having a temporal change in an intensity and to output the second optical signal, the temporal change in the intensity corresponding to the temporal change in the wavelength; and circuitry configured to acquire inspection information on the inspection target object on a basis of the second optical signal, and correct a correspondence relationship between the temporal change in the wavelength of the first optical signal and the temporal change in the intensity of the second optical signal by changing a wavelength characteristic of the optical filter, the correspondence relationship being directed to converting the first optical signal into the second optical signal.

BRIEF DESCRIPTION OF THE DRAWINGS

The accompanying drawings are included to provide a further understanding of the technology and are incorporated in and constitute a part of this specification. The drawings illustrate example implementations and, together with the specification, serve to explain the principles of the technology.

(A) of FIG. 5 is a graph illustrating an example change in a wavelength of an optical signal output from the optical fiber sensor illustrated in FIG. 1 caused by an external disturbance, and (B) of FIG. 5 is a graph illustrating an example in which the wavelength characteristic of an optical filter is so corrected as to cancel the change in the wavelength.

DETAILED DESCRIPTION

An optical inspection system, an optical inspection method, and an aircraft structure according to some implementations of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The ultrasonic inspection method according to any implementation of the technology allows for structural health monitoring (SHM) of structures, such as aircraft structures and buildings.

On the other hand, in a case where a target object of an ultrasonic inspection is a moving body, such as an aircraft, the target structure of the ultrasonic inspection may change in temperature in a short period of time or may be deformed by a load exerted on the target structure. The temperature of the aircraft structure and the load exerted on the aircraft structure may change greatly larger than the temperature of a structure used on the ground and the load exerted on the structure used on the ground. In a case where a target object of the ultrasonic inspection is a structure constituting a moving body, a vibration may be generated in the target object of the ultrasonic inspection.

For the ultrasonic inspection performed with the use of an optical fiber sensor, a change in a condition of the target structure, such as the temperature of the target structure, the magnitude of a vibration generated in the target structure, or a distribution of strain caused by a load exerted on the target structure, can cause a change in a wavelength characteristic of an optical signal output from the optical fiber sensor, for example. This can make it difficult to acquire an optical signal under a condition appropriate for processing the optical signal for the ultrasonic inspection. In other words, there may be room for an improvement in sensitivity and accuracy in detecting an ultrasonic wave detection signal, depending on the condition of the target structure of the ultrasonic inspection.

Accordingly, it is desirable to continue a nondestructive inspection, such as an ultrasonic inspection with the use of an optical fiber sensor, with a practical accuracy even when a change is caused in a condition, such as the temperature, the acceleration rate, or the amount of strain, of a target structure of the inspection.

[First Implementation]
[Configuration and Operation of Optical Inspection System]

Figure 1:
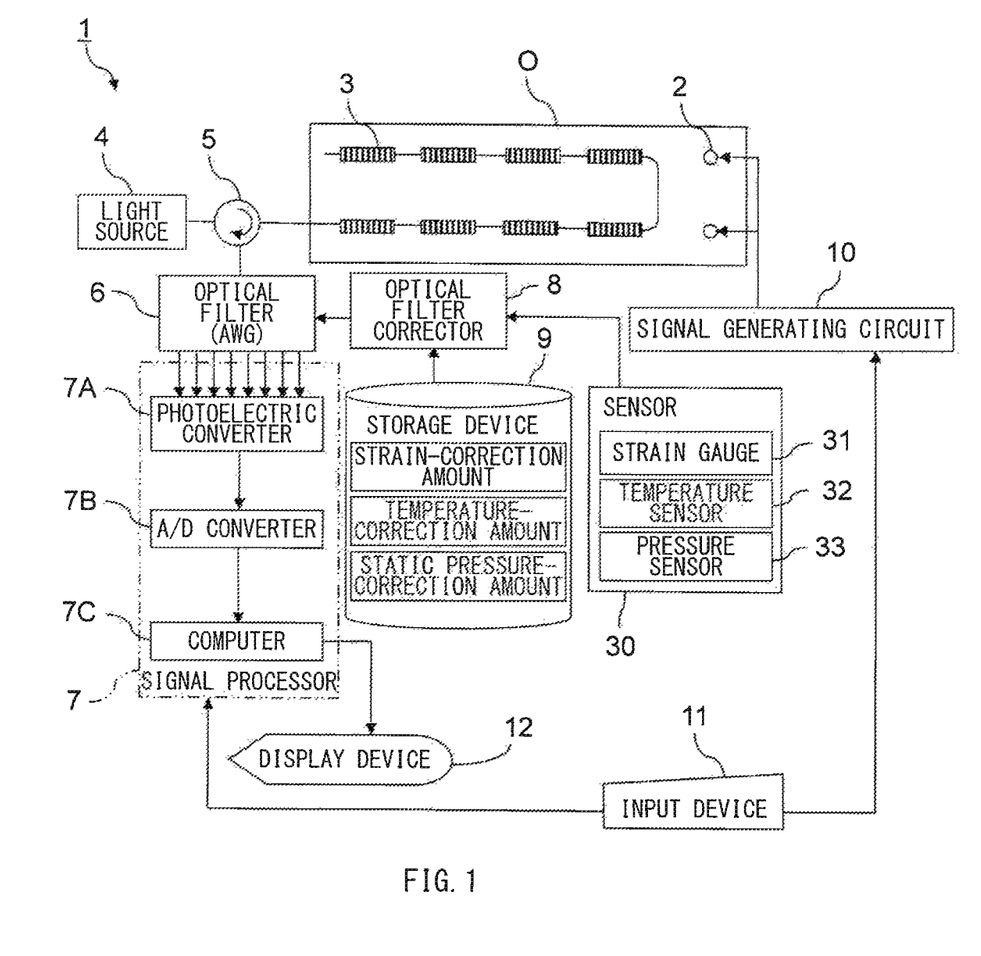
FIG. 1 is a diagram illustrating an example configuration of an optical inspection system according to one example implementation of the technology.

FIG. 1 illustrates an example configuration of an optical inspection system 1 according to a first implementation of the technology.

The optical inspection system 1 may perform an ultrasonic inspection of an inspection target object O. In this example implementation, the inspection target object O may be an aircraft structure, and the inspection is made to determine the presence and the progress of a defect, such as damage or a crack. It should be understood that it is also possible to perform a similar ultrasonic inspection on a structure constituting another moving body, such as an automobile, or a structure, such as a building. The inspection may be made to determine not only the presence of a defect but also the amount of strain or the thickness of the inspection target object O. In a case where the inspection target object O is an aircraft structure, the optical inspection system 1 may be provided in the aircraft structure.

The optical inspection system 1 may include an ultrasonic vibrator 2, an optical fiber sensor 3, a light source 4, an optical circulator 5, an optical filter 6, a signal processor 7, an optical filter corrector 8, a storage device 9, a signal generating circuit 10, an input device 11, and a display device 12.

The ultrasonic vibrator 2 may be an element, such as an actuator, that emits an ultrasonic wave toward an inspection target area on the inspection target object O and causes an ultrasonic vibration to propagate in the inspection target object O. In a case where the inspection target area is broad, a plurality of ultrasonic vibrators 2 may be disposed at an appropriate interval, as illustrated in FIG. 1. If the inspection target object O has a plate-like shape, the ultrasonic vibrator 2 may emit a Lamb wave as the ultrasonic wave to improve the detection sensitivity of the inspection. The Lamb wave may propagate in a thin plate having a thickness no more than one half of the wavelength of the ultrasonic wave.

The optical fiber sensor 3 may be an ultrasonic wave sensor that detects an ultrasonic vibration propagating in the inspection target object O. In a case where the inspection target area is broad, a plurality of optical fiber sensors 3 may be disposed at an appropriate interval, as illustrated in FIG. 1.

Non-limiting examples of the optical fiber sensor 3 may include an FBG sensor and a PS-FBG sensor. Another example of the optical fiber sensor 3 may be an interferometer that measures a physical quantity with the use of interference of light. There is a variety of interferometers, including a Mach-Zehnder interferometer, a Michelson interferometer, a ring interferometer, and a Fabry-Perot interferometer. In the example implementations described below, the optical fiber sensor 3 is the FBG sensor.

Upon detecting an ultrasonic vibration, the optical fiber sensor 3 outputs an optical signal having a temporal change in the wavelength corresponding to a temporal change in the amplitude of the ultrasonic vibration. A part of the reason for this is that the light transmitting characteristic and the light reflecting characteristic of the optical fiber sensor 3 shift in the wavelength direction of the light as the length of the optical fiber sensor 3 changes in accordance with the amplitude of the ultrasonic vibration propagating in the optical fiber sensor 3.

Reflected light of the optical fiber sensor 3 may be detected as an optical signal, or transmitted light of the optical fiber sensor 3 may be detected as an optical signal. FIG. 1 illustrates an example in which reflected light of the optical fiber sensor 3 is detected as an optical signal. In this example, the optical circulator 5 may be coupled to one end of the optical fiber sensor 3. Further, an optical system may be configured in which the light source 4 for emitting laser light toward the optical fiber sensor 3 is coupled to an entry port of the optical circulator 5, and reflected light of the laser light reflected by the optical fiber sensor 3 is configured to be output as an optical detection signal from an exit port of the optical circulator 5. In a case where transmitted light of the optical fiber sensor 3 is detected as an optical signal, an optical system may be configured in which the transmitted light is configured to be output as an optical signal from the other end of the optical fiber sensor 3.

The optical filter 6 may be an optical device that converts an optical signal having a temporal change in the wavelength output from the optical fiber sensor 3 into an optical signal having a temporal change in the intensity and outputs the optical signal. The temporal change in the intensity may correspond to the temporal change in the wavelength. The optical filter 6 may be, for example but not limited to, an AWG. The AWG may be an optical device in which an input-side slab waveguide and an output-side slab waveguide are coupled to each other with a plurality of curved channel waveguides having different optical path lengths.

Figure 2:
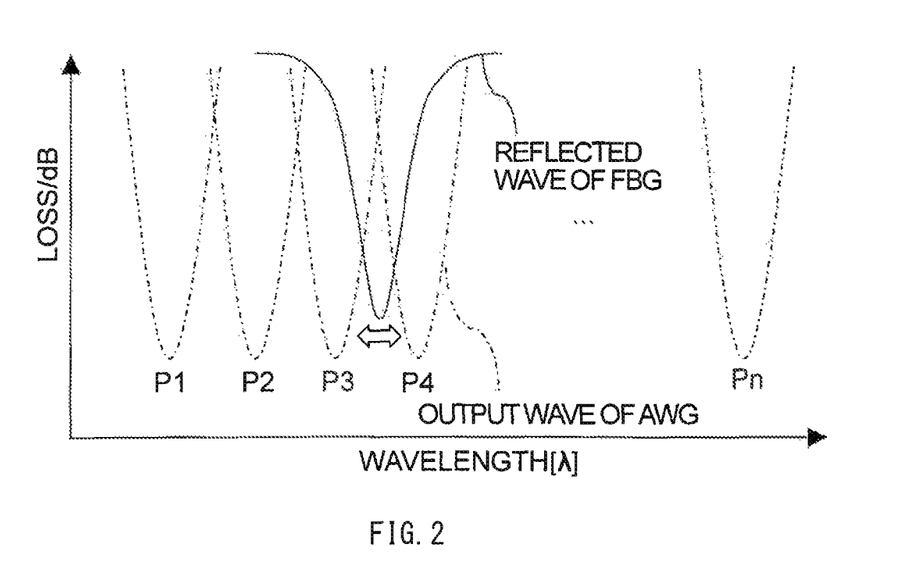
FIG. 2 is a graph illustrating a principle on which an AWG serves as an optical filter for an optical signal output from an FBG sensor used as an optical fiber sensor illustrated in FIG. 1.

FIG. 2 is a graph illustrating a principle in which the AWG serves as the optical filter 6 for an optical signal output from the FBG sensor serving as the optical fiber sensor 3 illustrated in FIG. 1.

In FIG. 2, the horizontal axis represents a light wavelength (λ), and the vertical axis represents an optical intensity loss (dB). When light including light components having different wavelengths is allowed to enter the AWG, respective light beams having different wavelengths may be output. In other words, the use of the AWG may allow incident light to be split into light beams having different wavelengths. Accordingly, as indicated by dashed-dotted lines in FIG. 2, the loss of light output from the AWG may be reduced at respective specific wavelengths of n output ports (i.e., P1, P2, P3, . . . , and Pn) of the AWG and may yield n local minima, where n is a natural number. In other words, only the light having specific wavelengths with non-consecutive values corresponding to the respective local minima of the curves indicated by the dashed-dotted lines in FIG. 2 may selectively pass through the AWG.

Meanwhile, as indicated by a solid line in FIG. 2, reflected light from the FBG sensor may have an intensity distribution projecting downward with a minimum loss at a specific wavelength. As a result, the optical signal output from the FBG sensor may be a signal the optical intensity distribution in the wavelength direction of which temporally vibrates in the wavelength direction, as illustrated in FIG. 2.

Accordingly, as illustrated in FIG. 2, in a case where the peak of the intensity of the optical signal output from the FBG sensor falls between the center wavelength of light that is able to pass through the output port P3 of the AWG and the center wavelength of light that is able to pass through the output port P4, the intensity of light output from the output port P4 of the AWG becomes higher as the wavelength of the optical signal becomes longer, and conversely, the intensity of light output from the output port P3 of the AWG becomes higher as the wavelength of the optical signal becomes shorter. Therefore, the optical signals output from the output ports P1, P2, P3, . . . , and Pn of the AWG may each be a signal having an intensity changing over time.

For example, it is possible to amplify the amplitude of an optical signal having a temporal change in the wavelength by inverting the intensity of one of the two optical signals output from two adjacent output ports of the AWG, that is, two output ports of which the center wavelengths of the output optical signals are closest and by obtaining a difference between the two optical signals. As a result, it is possible to drastically improve the sensitivity in detecting a defect of the inspection target object O.

In a case where optical signals are output from a plurality of optical fiber sensors 3, as illustrated in FIG. 1, the wavelength characteristics of the respective optical fiber sensors 3 may be determined such that the center wavelengths of the optical signals output from the respective optical fiber sensors 3 change within a range of the wavelengths corresponding to the different output ports P1, P2, P3, . . . , and Pn of the AWG. This makes it possible to convert the optical signals output from the respective optical fiber sensors 3 and indicating a temporal change in the wavelength into signals indicating a temporal change in the intensity with the use of a common AWG. Note that details of such a signal processing using the AWG as the optical filter 6 is disclosed in JP-A No. 2007-232371.

The signal processor 7 may acquire inspection information of the inspection target object O on the basis of an optical signal output from the AWG serving as the optical filter 6 and indicating a temporal change in the intensity. The signal processor may include circuits including a photoelectric converter 7A, an analog-to-digital (A/D) converter 7B, and a computer 7C loaded with a program, for example. The signal processor 7 may process an optical signal or an electric signal, or both.

Optionally, there may be provided an optical element or an optical device that processes an optical signal, and an electric circuit that processes an analog electric signal. In one example, a circuit that performs a filtering process or an averaging process to reduce noise may be coupled to a signal line of an optical signal or an electric signal.

The photoelectric converter 7A may be a photodetector that converts optical signals output from the optical filter 6 and having different wavelengths into respective electric signals. The photoelectric converter 7A may convert the optical signals having the respective wavelengths into analog electric signals, and the A/D converter 7B may convert the analog electric signals into digital electric signals and output the digital electric signals to the computer 7C. The computer 7C may perform a desired signal process on the digital electric signals to acquire inspection information on the inspection target object O.

In other words, information as to whether a defect is present in the inspection target area on the inspection target object O or information on the degree of the defect present in the inspection target area on the inspection target object O or both may be acquired as the inspection information on the inspection target object O through the signal process in the computer 7C. In addition, the amount of strain in the inspection target area on the inspection target object O may be acquired as the inspection information through a signal process in the computer 7C, as described above.

The computer 7C may acquire two electric signals obtained through photoelectric conversion of two optical signals output from the AWG used as the optical filter 6 and having different center wavelengths. In one example, the computer 7C may execute a signal process that inverts the intensity of one of the two electric signals and obtains a difference between the two electric signals, as described above. This allows for generation of a signal having a temporal change in the intensity corresponding to a slight temporal change in an expansion and contraction amount of the optical fiber sensor 3, such as an FBG sensor. Therefore, it is possible to acquire a signal having a temporal change in the intensity corresponding to the amplitude of the ultrasonic vibration propagating in the inspection target area on the inspection target object O.

Once the temporal waveform of an ultrasonic wave detection signal corresponding to the amplitude of the ultrasonic vibration is acquired, the acquired temporal waveform may be compared with a reference waveform, for example, to determine whether a defect is present in the inspection target area on the inspection target object O. For example, the reference waveform may be a temporal waveform of the amplitude of the ultrasonic wave detection signal acquired in a case where no defect is present in the inspection target area on the inspection target object O. In this case, if a defect is present in the inspection target area, the waveform of an ultrasonic vibration passing through the inspection target area or the waveform of vibration of an ultrasonic wave reflected by the inspection target area may change. The change may be used to determine whether a defect is present in the inspection target area. In other words, in a case where a least square error, a correlation value, a peak value difference, or any other index value indicating a deviation amount between the temporal waveform of the signal to be inspected and the reference waveform is equal to or greater than a threshold value, it may be determined that a defect is present in the inspection target area.

Another signal processing technique that involves calculating an index value, such as a root mean square (RMS), that indicates a feature of the temporal waveform of the ultrasonic wave detection signal and executing a threshold process on the index value may be used to determine whether a defect is present in the inspection target area, without executing a comparison against the reference waveform. Further, a process of acquiring a temporal change in the acceleration rate of the amplitude of the ultrasonic vibration, an averaging process, a filtering process for removing noise, a moving averaging process, frequency analysis process such as a Fourier transform or a wavelet transform, an envelope detection process, or any other desired signal process may be executed prior to the threshold process.

In a case where a plurality of optical fiber sensors 3 are disposed in the inspection target area, each of the optical fiber sensors 3 may determine whether a defect is present. Thus, identifying the optical fiber sensors 3 that have detected the presence of a defect helps evaluating the size of the defect as well. In other words, the degree of the defect present in the inspection target area on the inspection target object O may be acquired as an inspection content.

In an example case where the inspection content is a value such as the amount of strain or the thickness, the value of interest may be determined on the basis of a preliminarily-created database about the relationship between the value of interest, such as the amount of strain, and the signal waveform. Also in this example, the inspection content may be acquired through comparing the signal waveform with the reference waveform or evaluating the feature amount of the signal waveform.

However, when an incident occurs that may cause the length of the optical fiber sensor 3 to change—such as a rapid change in the temperature, an occurrence of strain, or a vibration of the inspection target object O, the optical signal output from the optical fiber sensor 3 may change affected by the incident. In other words, the wavelength of the optical signal output from the optical fiber sensor 3 may change not only due to the presence of a defect but also due to an influence of an incident such as the change in the temperature, the occurrence of strain, or the vibration. In this case, there may be room for an improvement in accuracy in detecting the inspection content.

For example, in a case where the inspection target object O is an aircraft structure, the aircraft structure may fly high above in the sky while being subjected to an aerodynamic load. Thus, the amount of change in the temperature per unit time, the amount of change in the amount of strain per unit time, and the magnitude of the vibration of the aircraft structure may be extremely greater than those of a structure used in a stationary state and also a structure of a moving body used on the ground.

Figure 3:
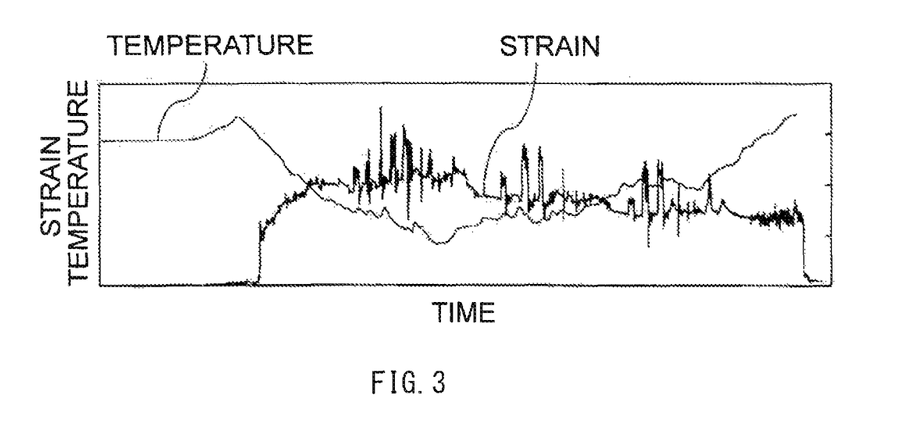
FIG. 3 is a graph illustrating example changes in the temperature and the amount of strain of an aircraft structure that may serve as an inspection target object illustrated in FIG. 1.

FIG. 3 is a graph illustrating example changes in the temperature and the amount of strain of the aircraft structure that may be the inspection target object O illustrated in FIG. 1.

In FIG. 3, the horizontal axis represents the time, and the vertical axis represents the amount of strain and the temperature. An aircraft structure may fly high above in the sky while being subjected to a change in the pressure and a change in the altitude and while experiencing a load exerted by the aerodynamic force. Therefore, as illustrated in FIG. 3, the amount of strain and the temperature of the aircraft structure may greatly change while the aircraft structure is flying. Thus, the optical fiber sensor 3 may expand or contract along with the inspection target object O.

When the optical fiber sensor 3 expands or contracts, the wavelength distribution of the optical signal output from the optical fiber sensor 3 may shift in the wavelength direction. In this case, the amplitude of the optical signal passing through the AWG used as the optical filter 6 may change. This can result in erroneous identification of a defect despite no defect is present, in a signal process in the signal processor 7 that involves comparing the signal waveform with the reference waveform to detect a defect or evaluation the feature amount of the signal waveform, for example. In other words, there may be a possibility that a defect is erroneously detected due to, for example but not limited to, a change in the temperature or the amount of strain of the inspection target object O.

For example, in a case where it is determined whether a defect is present in a composite material used for the aircraft structure, such as fiber reinforced plastics (FRP) reinforced with resin (e.g., glass fiber reinforced plastics (GFRP) or carbon fiber reinforced plastics (CFRP)), an ultrasonic wave that changes at a high frequency of about several tens kHz to about 10 MHz may be emitted. In this case, in the optical fiber sensor 3, an ultrasonic wave may be detected as a time history of a change in a slight strain of about several µε. Therefore, it may be often the case that the change in the temperature of the inspection target object O or the change in the amount of strain in the inspection target object O, for example, results in a nonnegligible external disturbance.

Accordingly, the optical filter 6 may be provided with the optical filter corrector 8 that changes the wavelength characteristic of the optical filter 6. The optical filter corrector 8 may so shift the wavelength characteristic of the optical filter 6 in the wavelength direction as to cancel the change in the wavelength of the optical signal caused by a defect or another factor other than the inspection content, out of the changes in the wavelength of the optical signal output from the optical fiber sensor 3. In other words, the optical filter corrector 8 corrects the correspondence relationship between the temporal change in the wavelength of the optical signal and the temporal change in the intensity of the optical signal. Note that the correspondence relationship may be directed to converting an optical signal having a temporal change in the wavelength output from the optical fiber sensor 3 into an optical signal having a temporal change in the intensity.

In order to adjust the wavelength characteristic of the AWG used as the optical filter 6 in the wavelength direction, it may be necessary to change the length of an optical path formed by a curved channel waveguide constituting the AWG. Therefore, the optical filter corrector 8 may be any device that is able to change the wavelength characteristic of the optical filter 6 by causing the waveguide constituting the optical filter 6 to expand or contract. To cause the waveguide constituting the optical filter 6 to expand and contract, the waveguide constituting the optical filter 6 may be heated and cooled, or subjected to a mechanical force, for example.

Figure 4:
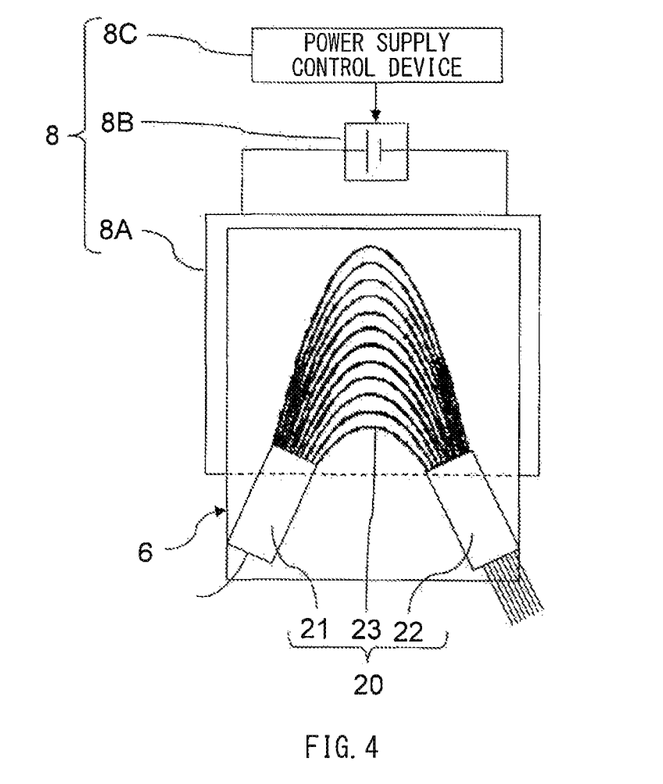
FIG. 4 is a diagram illustrating an example configuration of an optical filter corrector configured to change a wavelength characteristic of an optical filter by adjusting the temperature of an optical waveguide constituting the optical filter illustrated in FIG. 1.

FIG. 4 illustrates an example configuration of the optical filter corrector 8 configured to change the wavelength characteristic of the optical filter 6 by adjusting the temperature of the optical waveguide constituting the optical filter 6 illustrated in FIG. 1.

The optical filter 6 may be an AWG 20 that is an optical device in which an input-side slab waveguide 21 and an output-side slab waveguide 22 are coupled to each other with a plurality of curved channel waveguides 23 having different optical path lengths, as described above.

The optical filter corrector 8 may include a Peltier element 8A, a direct current (DC) power supply 8B, and a power supply control device 8C. The Peltier element 8A may be a semiconductor element that controls the temperature of the optical waveguide of the optical filter 6 by cooling and heating the optical waveguide using a DC current. Thus, attaching the Peltier element 8A directly or indirectly to a portion of the AWG 20 to be changed in temperature changes the length of the curved channel waveguides 23 constituting the AWG 20. An appropriate position at which the Peltier element 8A is to be attached may be determined through testing or a simulation.

The DC power supply 8B may apply a DC voltage to the Peltier element 8A. The power supply control device 8C may be an electric circuit that controls the DC voltage applied from the DC power supply 8B to the Peltier element 8A. Thus, controlling, with the power supply control device 8C, the DC voltage applied from the DC power supply 8B to the Peltier element 8A changes the wavelength characteristic of the AWG 20 used as the optical filter 6. In other words, it is possible to shift, in the wavelength direction, the intensity distribution in the wavelength direction of the optical signal that is allowed to pass through the AWG 20 used as the optical filter 6.

As illustrated in FIG. 4, the optical characteristic of the optical filter 6 is adjusted precisely and accurately with a simple configuration through the temperature control of the optical filter 6. The temperature of the optical filter 6 may be controlled with the use of a temperature controlling device, such as a thermoelectric element, as well as the Peltier element 8A. Further, the optical characteristic of the optical filter 6 may be adjusted by causing the optical filter 6 to mechanically expand or contract with the use of an expansion and contraction mechanism, such as a ball screw, a rack and pinion mechanism, or a cylinder mechanism. Alternatively, the optical characteristic of the optical filter 6 may be adjusted through the combined use of the temperature control of the optical filter 6 and the expansion and contraction mechanism.

Figure 5:
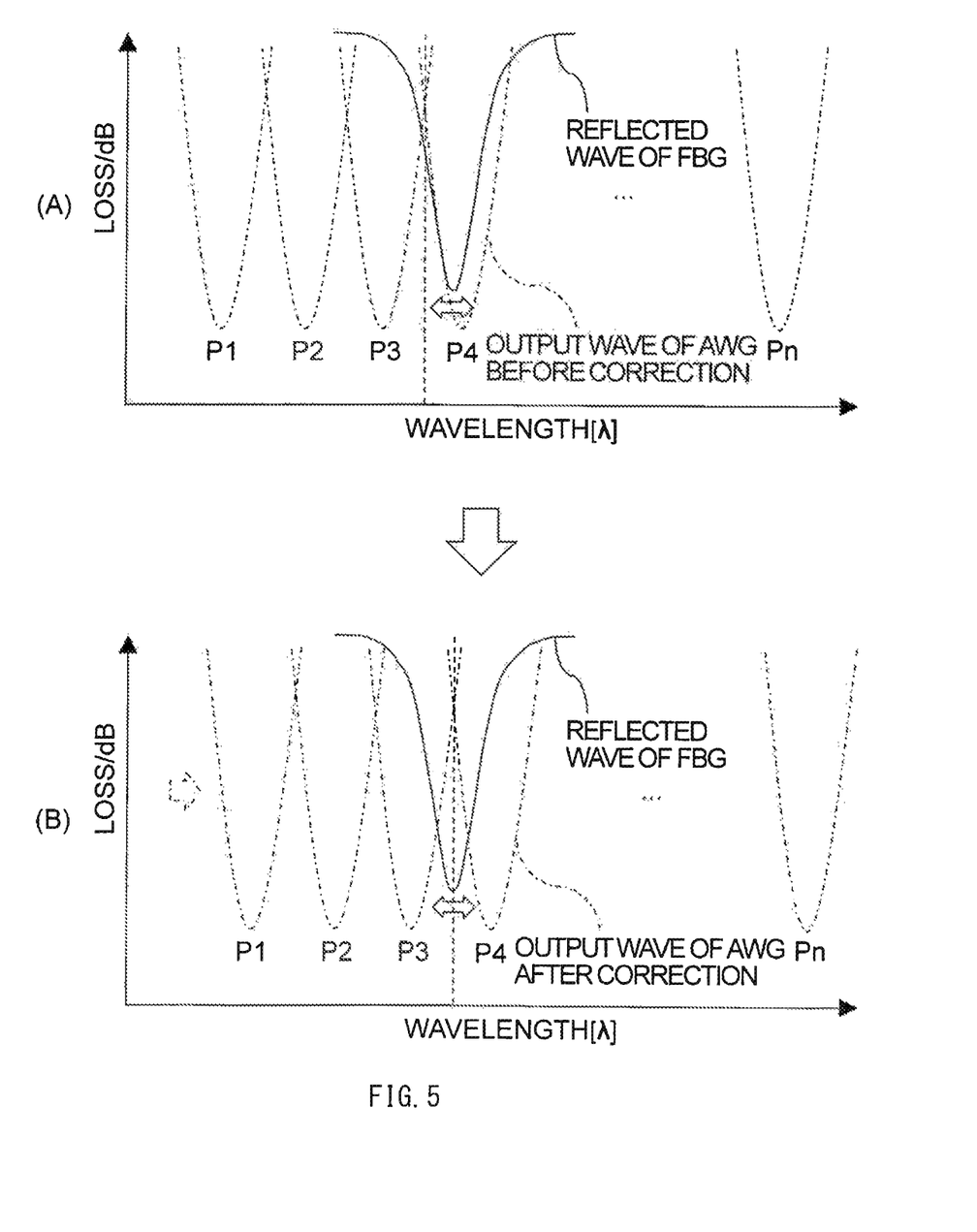

(A) of FIG. 5 is a graph illustrating an example change in the wavelength of the optical signal output from the optical fiber sensor 3 illustrated in FIG. 1 caused by an external disturbance. (B) of FIG. 5 is a graph illustrating an example in which the wavelength characteristic of the optical filter 6 is so corrected as to cancel the change in wavelength.

In each of (A) of FIG. 5 and (B) of FIG. 5, the horizontal axis represents the wavelength ($\lambda$), and the vertical axis represents the optical intensity loss (dB). When a rapid change in the temperature, a change in the amount of strain, a vibration, or another factor that causes the optical fiber sensor 3 to expand or contract arises in the inspection target object O, the wavelength spectrum of the optical signal output from the optical fiber sensor 3 may shift in the wavelength direction, as illustrated in (A) of FIG. 5. In this case, as illustrated in (A) of FIG. 5, an overlap region between the wavelength spectrum of the transmitted light of the AWG and the wavelength spectrum of the optical signal may become inappropriate. This may hinder the intensity of the optical signal output from the AWG from changing to the extent that allows the intensity to be detected.

Accordingly, as illustrated in (B) of FIG. 5, the transmission characteristic of the AWG in the wavelength direction may be shifted to relatively cancel the shift of the optical signal output from the optical fiber sensor 3 in the wavelength direction. For example, as illustrated in (B) of FIG. 5, the transmission characteristic of the AWG in the wavelength direction may be so shifted as to cause the wavelength at the center between the adjacent local minima on the curves representing the transmission characteristic of the AWG in the wavelength direction to fall at the center wavelength of the wavelength spectrum of the optical signal output from the optical fiber sensor 3.

In order to shift the wavelength characteristic of the optical filter 6 in the wavelength direction to cancel the change in the wavelength of the optical signal caused by a defect or another factor other than the inspection content, out of the changes in the wavelength of the optical signal output from the optical fiber sensor 3, it may be necessary to preliminarily examine the amount of change in the wavelength of the optical signal caused by each factor other than the inspection content, such as a change in the temperature. The amount of change in the wavelength of the optical signal caused by each factor other than the inspection content may be examined through testing or a simulation. Once the amount of change in the wavelength of the optical signal caused by each factor other than the inspection content is obtained, the amount of change in the wavelength of the optical signal may serve as the amount of change by which the optical filter 6 is to be changed in the wavelength characteristic.

Accordingly, information, such as a table or a function, representing a relationship between a value indicating the condition of the inspection target object O, such as the temperature or the amount of strain, and the amount of change by which the optical filter 6 is to be changed in the wavelength characteristic may be stored in the storage device 9. The optical filter corrector 8 may be configured to change the wavelength characteristic of the optical filter 6 by the amount of change determined with reference to the information, such as the table or the function, stored in the storage device 9.

In a case where the inspection target object O is an aircraft structure, as illustrated in FIG. 4, the change in the temperature of the inspection target object O and the change in the amount of strain in the inspection target object O may serve as main factors for the change in the wavelength of the optical signal output from the optical fiber sensor 3. Thus, in one example, the storage device 9 may hold information indicating the relationship between the temperature of the inspection target object O and the amount of change by which the optical filter 6 is to be changed in the wavelength characteristic, or information indicating the relationship between the amount of strain in the inspection target object O and the amount of change by which the optical filter 6 is to be changed in the wavelength characteristic, or both.

In a case where the inspection target object O is an aircraft structure, it may be conceivable that the amount of strain in the inspection target object O changes depending on a load exerted on the structure including the inspection target object O. Thus, in place of the amount of strain or in addition to the amount of strain, the storage device 9 may hold information indicating the relationship between the pressure to be exerted on the structure including the inspection target object O and the amount of change by which the optical filter 6 is to be changed in the wavelength characteristic.

On the basis of the information stored in the storage device 9, such as the information indicating the relationship between the amount of change by which the optical filter 6 is to be changed in the wavelength characteristic and one or more parameters representing an external disturbance including the temperature of the inspection target object O, the amount of strain present in the inspection target object O, or the pressure to be exerted on the structure including the inspection target object O, the optical filter corrector 8 may change the wavelength characteristic of the optical filter 6 by the amount of change corresponding to the value of the parameter representing the external disturbance, such as the temperature of the inspection target object O, the amount of strain in the inspection target object O, or the pressure to be exerted on the structure including the inspection target object O.

For example, the optical filter corrector 8 having the configuration illustrated in FIG. 4 may be configured to control the DC voltage applied from the DC power supply 8B to the Peltier element 8A to change the wavelength characteristic of the optical filter 6 by a target amount of change. Therefore, information indicating the value of the DC voltage to be applied from the DC power supply 8B to the Peltier element 8A may be stored into the storage device 9. The information may indirectly indicate the amount of change in the wavelength characteristic of the optical filter 6. Also in a case where the optical filter corrector 8 changes the wavelength characteristic of the optical filter 6 through a different mechanism, the amount of change in the wavelength characteristic of the optical filter 6 may be indicated indirectly by a parameter to be controlled in order to change the wavelength characteristic of the optical filter 6.

In order for the optical filter corrector 8 to change the wavelength characteristic of the optical filter 6 by the amount of change corresponding to the value of the parameter representing the condition of the inspection target object O, it may be necessary to identify the conversion information between the parameter and the conversion amount of the wavelength characteristic of the optical filter 6 stored in the storage device 9 and the value of the parameter representing the condition of the inspection target object O held when the optical fiber sensor 3 detects an ultrasonic vibration.

Accordingly, the optical filter corrector 8 may acquire, in real time, the value of the parameter representing the current condition of the inspection target object O from a desired information source such as a sensor 30. The optical filter corrector 8 may be configured to set the conversion amount of the wavelength characteristic of the optical filter 6 with reference to the value of the parameter representing the current condition of the inspection target object O acquired, in real time, from the information source such as the sensor 30 and the conversion information of the value of the parameter yielding the conversion amount of the wavelength characteristic of the optical filter 6 stored in the storage device 9.

The sensor 30 may be a component of the inspection target object O provided in the inspection target object O or may be a component of the optical inspection system 1 to be attached to the inspection target object O. In one example where the inspection target object O is an aircraft structure, it may be often the case that the sensor 30, such as a strain gauge 31 for measuring the amount of strain in the inspection target object O, a temperature sensor 32 for measuring the temperature of the inspection target object O, or a pressure sensor 33 for measuring the static pressure exerted on the aircraft structure including the inspection target object O, may be attached to the inspection target object O. A typical example of the pressure sensor 33 for the aircraft structure may include a pressure sensor that includes a static tube, a pitot static tube, or a static port.

Such a correction of the wavelength characteristic of the optical filter 6 in the wavelength direction performed by the optical filter corrector 8 may make it possible to continue the ultrasonic inspection with sufficient accuracy even in a case where the condition, such as the temperature, the amount of strain, or the acceleration rate, of the inspection target object O changes. In a case where the inspection target object O is inspected for the amount of strain, a factor, such as a vibration, other than the amount of strain in the inspection target object O may become an external disturbance against the optical signal. Since the amount of strain in the inspection target object O has temperature dependence, the change in the temperature of the inspection target object O may not necessarily be considered as an external disturbance against the optical signal. Therefore, the wavelength characteristic of the optical filter 6 may be corrected in accordance with the value of the parameter representing the condition other than the amount of strain in the inspection target object O, such as the acceleration rate.

The signal generating circuit 10 may be an electric circuit that outputs an electric signal to the ultrasonic vibrator 2 to cause the ultrasonic vibrator 2 to emit an ultrasonic wave. The signal generating circuit 10 may be configured to operate in response to an operation of the input device 11. In other words, manually operating the input device 11 may cause the ultrasonic vibrator 2 to emit an ultrasonic wave. In an alternatively example, a timer embedded in the signal generating circuit 10 may cause the signal generating circuit 10 to operate and cause the ultrasonic vibrator 2 to emit an ultrasonic wave at a preset time.

The input device 11 may be, for example but not limited to, a mouse, a keyboard, a switch, or another device for inputting necessary information into the optical inspection system 1. The display device 12 may display desired information generated in the optical inspection system 1. For example, the display device 12 may display a user interface screen or the inspection information acquired in the signal processor 7.

[Optical Inspection Method Performed with the Use of Optical Inspection System]

An optical inspection method performed with the use of the optical inspection system 1 will now be described.

Figure 6:
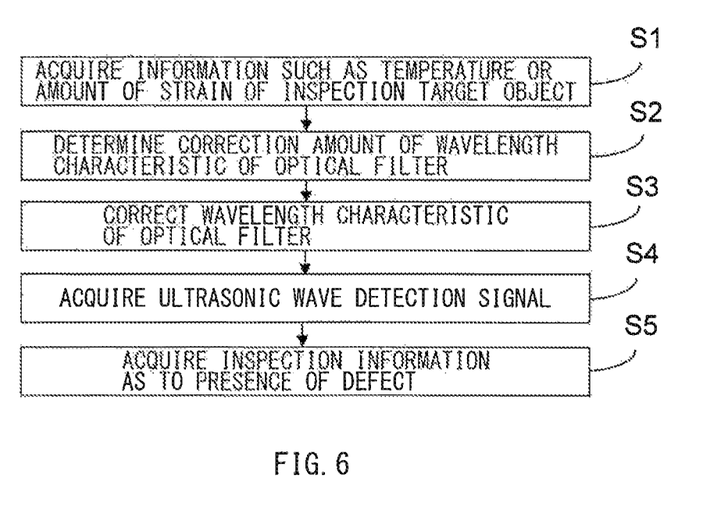
FIG. 6 is a flowchart illustrating an example flow of acquiring inspection information of an inspection target object with the use of the optical inspection system illustrated in FIG. 1.

FIG. 6 is a flowchart illustrating an example flow of acquiring inspection information on the inspection target object O with the use of the optical inspection system 1 illustrated in FIG. 1.

In Step S1, information on the factor, such as the temperature or the amount of strain of the inspection target object O, that serves as an external disturbance in the ultrasonic inspection may be acquired. For example, the optical filter corrector 8 may acquire, from each sensor 30, the values of the parameters each representing the condition of the inspection target object O, such as the temperature or the amount of strain of the inspection target object O, measured with the sensor 30. For example, the sensor 30 may be the strain gauge 31 or the temperature sensor 32, as described above.

In a case where the inspection target object O is an aircraft structure, such as a wing structure (e.g., a main wing structure or a tail structure) of an aircraft or a body of the aircraft, the optical filter corrector 8 may acquire, from each pressure sensor 33 disposed on the surface of the aircraft, the static pressure exerted on the aircraft structure including the inspection target object O as a value of the parameter representing the condition of the inspection target object O.

In Step S2, the correction amount of the wavelength characteristic of the AWG used as the optical filter 6 may be determined on the basis of the value of the parameter representing the condition of the inspection target object O, such as the temperature or the amount of strain of the inspection target object O. For example, the optical filter corrector 8 may refer to the correspondence information between each value of the parameter and a corresponding correction amount of the wavelength characteristic of the optical filter 6 stored in the storage device 9 and identify the correction amount of the wavelength characteristic of the optical filter 6 corresponding to the value of the parameter measured with the sensor 30.

In Step S3, the wavelength characteristic of the AWG used as the optical filter 6 may be corrected by the correction amount corresponding to, for example but not limited to, the temperature or the amount of strain of the inspection target object O. For example, the optical filter corrector 8 may cause the length of the curved channel waveguide of the AWG to increase or decrease to shift the wavelength characteristic of the AWG in the wavelength direction by the correction amount determined in Step S2.

For example, in a case where the optical filter corrector 8 is configured to correct the wavelength characteristic of the AWG 20 by adjusting the temperature of the curved channel waveguides 23 of the AWG 20 with the use of a temperature controlling device, such as the Peltier element 8A, as illustrated in FIG. 4, the power supply control device 8C may cause the value of the DC voltage applied from the DC power supply 8B to the Peltier element 8A to be a value corresponding to the control value of the wavelength characteristic of the AWG 20.

Accordingly, the correspondence relationship between the temporal change in the wavelength of the optical signal and the temporal change in the intensity of the optical signal may be corrected. As described above, the correspondence relationship may be determined depending on the wavelength characteristic of the optical filter 6, and may be directed to converting an optical signal having a temporal change in the wavelength output from the optical fiber sensor 3 into an optical signal having a temporal change in the intensity. In other words, changing the wavelength characteristic of the optical filter 6 by the correction amount corrects the correspondence relationship between the temporal change in the wavelength of the optical signal and the temporal change in the intensity of the optical signal, so that the influence of an external disturbance, such as a change in the temperature of the inspection target object O or a change in the amount of strain in the inspection target object O, is cancelled.

In Step S4, an ultrasonic wave detection signal may be acquired with the optical system including the optical fiber sensor 3 and the optical filter 6 having a corrected wavelength characteristic. For example, the signal generating circuit 10 may generate a transmission signal in the form of an electric signal, and output the generated transmission signal to the ultrasonic vibrator 2. The ultrasonic vibrator 2 may convert the electric transmission signal into an ultrasonic wave signal, and emit an ultrasonic wave toward the inspection target area on the inspection target object O.

The ultrasonic wave emitted from the ultrasonic vibrator 2 may propagate through the inspection target area on the inspection target object O and reach the optical fiber sensor 3. The ultrasonic vibration propagating through the inspection target object O may cause the optical fiber sensor 3 to expand or contract. The wavelength characteristic of the optical fiber sensor 3 may change accordingly, and the wavelength spectrum of light output from the optical fiber sensor 3 may change accordingly. As a result, it is possible to detect the ultrasonic vibration as a temporal change in the wavelength of the light corresponding to a temporal change in a slight displacement of the optical fiber sensor 3. In other words, the optical fiber sensor 3 may convert the ultrasonic vibration propagating through the inspection target object O into an optical signal having a temporal change in the wavelength corresponding to a temporal change in the intensity of the ultrasonic vibration, and may output the converted optical signal.

The optical fiber sensor 3 may expand or contract not only due to the ultrasonic vibration but also due to an external disturbance, such as a rapid change in the temperature or a change in the amount of strain in the inspection target object O. Therefore, the optical signal output from the optical fiber sensor 3 may be shifted in the wavelength direction due to an influence of an external disturbance.

The optical signal output from the optical fiber sensor 3 may enter the AWG constituting the optical filter 6. The AWG may convert the optical signal having a temporal change in the wavelength into an optical signal having a temporal change in the intensity corresponding to the temporal change in the wavelength, and may output the converted optical signal. The correspondence relationship between the temporal change in the wavelength of the optical signal and the temporal change in the intensity of the optical signal may be determined depending on the overlap region between the wavelength spectrum of the optical signal output from the optical fiber sensor 3, such as an FBG sensor, and the transmission characteristic of the AWG, as illustrated in FIG. 2.

The optical signal output from the optical fiber sensor 3 may be shifted in the wavelength direction due to an influence of an external disturbance, such as a rapid change in the temperature of the inspection target object O or a change in the amount of strain of the inspection target object O, as described above. Therefore, if the wavelength characteristic of the AWG is not being corrected, as illustrated in FIG. 5A, the overlap region between the wavelength spectrum of the optical signal output from the optical fiber sensor 3, such as an FBG sensor, and the transmission characteristic of the AWG may become inappropriate for converting, at the AWG, the optical signal having a temporal change in the wavelength into the optical signal having a temporal change in the intensity corresponding to the temporal change in the wavelength.

In this respect, in Step S3, the transmission characteristic of the AWG may be so corrected as to cancel the shift in the wavelength direction of the optical signal output from the optical fiber sensor 3 due to an influence of an external disturbance. In one example, as illustrated in FIG. 5B, the transmission characteristic of the AWG may be so corrected as to cause the center wavelength of the optical signal output from the optical fiber sensor 3 to fall at the center wavelength between the adjacent local minima of the transmission characteristic of the AWG.

Thus, the optical signal output from the AWG may result in an optical signal having a temporal change in the intensity corresponding to a temporal change in the wavelength caused by the ultrasonic wave rather than an external disturbance. In other words, it may be possible to cancel the external disturbance and to acquire an optical signal having the temporal change in the intensity corresponding to a vibration waveform of the ultrasonic wave.

In Step S5, the inspection information of the inspection target object O may be acquired on the basis of the optical signal having the temporal change in the intensity output from the AWG. To this end, the photoelectric converter 7A of the signal processor 7 may convert the optical signal output from the AWG and indicating the temporal change in the intensity into an analog electric signal having a temporal change in the voltage. Thereafter, the A/D converter 7B may convert the analog electric signal obtained in the photoelectric converter 7A into a digital electric signal, and output the digital electric signal to the computer 7C. Accordingly, the computer 7C may be able to acquire an ultrasonic wave detection signal in the form of a digital electric signal having a temporal change in the relative voltage corresponding a temporal change in the amplitude of the ultrasonic vibration propagating through the inspection target area on the inspection target object O.

The ultrasonic wave detection signal acquired in the computer 7C may be subjected to any signal process to acquire the inspection information on the inspection target object O as to whether a defect is present in the inspection target area on the inspection target object O, for example.

To acquire the inspection information on the inspection target object O in a time series manner for a predetermined period, the operations and processes in Step S1 to Step S5 may be repeated in sequence.

[Example Effects]

The optical inspection system 1 and the optical inspection method according to the foregoing example implementation may configured to automatically adjust the wavelength characteristic of the optical filter 6 on the basis of the optical detection signal from the optical fiber sensor 3 in which the wavelength changes in accordance with the condition, such as the temperature, the amount of strain, or the acceleration rate, of the inspection target object O. For example, the optical inspection system 1 and the optical inspection method may be configured to preliminarily recognize the amount of change in the wavelength of the optical detection signal output from the optical fiber sensor 3 caused by an external disturbance, such as the temperature of the inspection target object O, the amount of strain in the inspection target object O, and/or the acceleration rate of the inspection target object O. Additionally, the optical inspection system 1 and the optical inspection method may be configured to automatically correct the wavelength characteristic of the optical filter 6 so that the wavelength characteristic of the optical filter 6 is constantly kept appropriate for the center wavelength of the optical detection signal from the optical fiber sensor 3.

Therefore, even in a case where the wavelength of the optical detection signal output from the optical fiber sensor 3 changes due to an external disturbance, such as the temperature of the inspection target object O, the amount of strain in the inspection target object O, and/or the acceleration rate of the inspection target object O, it is possible for the optical inspection system 1 and the optical inspection method to maintain the sensitivity and the accuracy of the ultrasonic inspection. Accordingly, even in a case where the spatial position or the speed of the inspection target object O changes as in the case of an aircraft structure, it is possible to perform the ultrasonic inspection with high sensitivity and high accuracy with the use of the optical fiber sensor 3 serving as an ultrasonic wave sensor. As a result, it is possible to avoid acquisition of an inaccurate inspection content, such as a false detection of a defect or an inaccurate amount of strain.

[Second Implementation]

Figure 7:
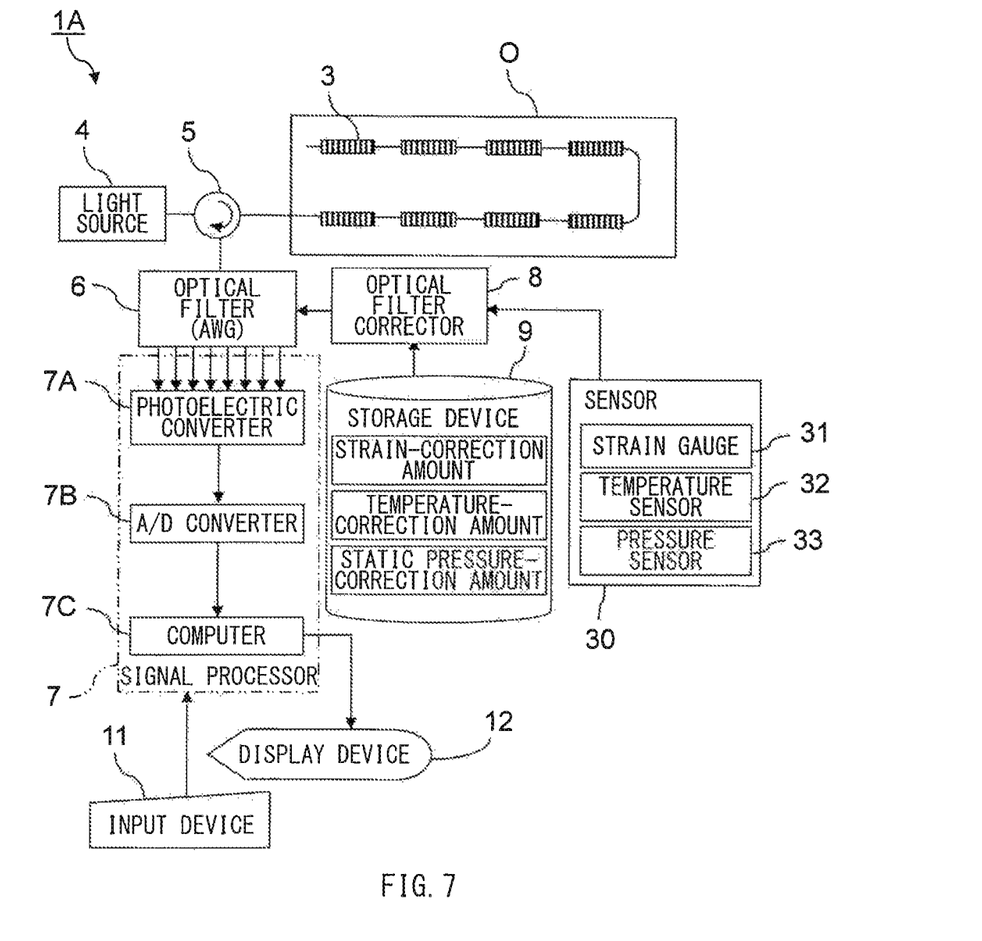
FIG. 7 is a diagram illustrating an example configuration of an optical inspection system according to one example implementation of the technology.

FIG. 7 illustrates an example configuration of an optical inspection system 1A according to a second implementation of the technology.

The optical inspection system 1A according to the second implementation illustrated in FIG. 7 may differ from the optical inspection system 1 according to the first implementation in that the inspection content of the inspection target object O is acquired without causing an ultrasonic vibration to propagate through the inspection target object O. The other configurations and workings of the optical inspection system 1A according to the second implementation may be substantially identical to those of the optical inspection system 1 according to the first implementation. Thus, the same referential characters or numbers may be given to identical configurations or corresponding configurations, and descriptions thereof will be omitted.

The optical fiber sensor 3 may detect, as a change in the wavelength of the optical signal, a temporal change in a slight displacement or a slight displacement produced in the inspection target object O by the use of a vibration propagating through the inspection target object O caused by another factor, in place of the ultrasonic vibration. Therefore, it is possible for the optical fiber sensor 3 to detect a displacement of the inspection target object O and to output an optical signal having a temporal change in the wavelength corresponding to a temporal change in the displacement.

In this case, for example, the signal processor 7 may acquire, as the inspection content, the amount of strain in the inspection target object O. In a case where the amount of strain in the inspection target object O is to be detected, the optical fiber sensor 3 may serve as a strain sensor. Further, in a case where the amount of strain in the inspection target object O is to be detected, a vibration or any other condition of the inspection target object O other than the amount of strain may become an external disturbance against the optical signal. Therefore, the wavelength characteristic of the optical filter 6 may be corrected in accordance with the value of the acceleration rate or any other parameter representing the condition of the inspection target object O other than the amount of strain. This may make it possible to output, from the optical filter 6, an optical signal the intensity of which changes in association with a change in the amount of strain in the inspection target object O.

In a case where the inspection target object O includes a composite material, another inspection for detecting an occurrence of a defect may be performed by detecting a vibration caused by acoustic emission (AE), for example. The AE may be a phenomenon in which strain energy that has accumulated in a composite material is emitted in the form of an elastic wave when the composite material deforms or cracks.

[Third Implementation]

Figure 8:
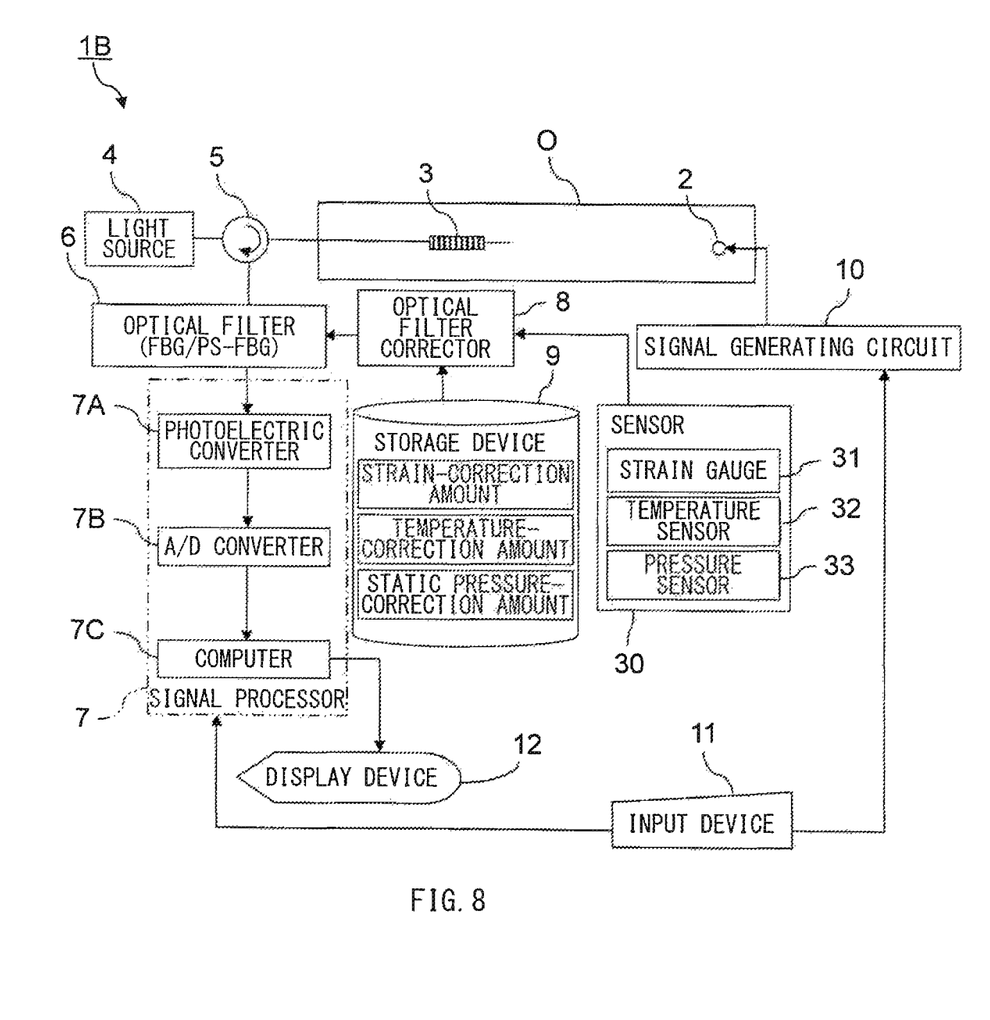
FIG. 8 is a diagram illustrating an example configuration of an optical inspection system according to one example implementation of the technology.

FIG. 8 illustrates an example configuration of an optical inspection system 1B according to a third implementation of the technology.

The optical inspection system 1B according to the third implementation illustrated in FIG. 8 may differ from the optical inspection system 1 according to the first implementation in that an FBG or a PS-FBG is used as the optical filter 6. The other configurations and workings of the optical inspection system 1B according to the third implementation may be substantially identical to those of the optical inspection system 1 according to the first implementation. Thus, the same reference characters or numbers may be given to identical configurations or corresponding configurations, and descriptions thereof will be omitted.

The FBG and the PS-FBG may have a transmission characteristic that transmits light having different intensities at different wavelengths and a reflection characteristic that reflects light having different intensities at different wavelengths. Therefore, the FBG or the PS-FBG having the transmission characteristic or the reflection characteristic that are determined so as to overlap the wavelength spectrum of the optical signal output from the optical fiber sensor 3 may be disposed in a path of the optical signal output from the optical fiber sensor 3. This makes it possible to cause the FBG or the PS-FBG to serve as the optical filter 6 that converts an optical signal having a temporal change in the wavelength into an optical signal having a temporal change in the intensity. JP-A No. 2014-153094, for example, discloses various examples in which an FBG or a PS-FBG is made to serve as the optical filter 6.

In the example illustrated in FIG. 8, the single optical fiber sensor 3 is disposed. However, even in a case where a plurality of optical fiber sensors 3 are disposed, it is possible to perform a similar ultrasonic inspection as long as the optical system is configured to allow the optical signal output from each optical fiber sensor 3 to pass through the optical filter 6 constituted by an FBG or a PS-FBG in a state in which each optical signal is distinguishable. For example, the optical fiber sensors 3 may be coupled to respective FBGs or PS-FBGs. Alternatively, the optical system may be configured to switch the optical signals output from the plurality of optical fiber sensors 3 and output the switched signal to a common FBG or PS-FBG.

Alternatively, the optical filter 6 in the optical inspection system 1A according to the second implementation may include the FBG or the PS-FBG. In other words, an ultrasonic wave need not be emitted in the third implementation.

[Other Implementations]

Although some implementations of the technology are described hereinabove, the foregoing implementations are merely examples and are not intended to limit the scope of the technology. The use of the terms first, second, etc. does not denote any order or importance, but rather the terms first, second, etc. are used to distinguish one element from another. It should be appreciated that modifications and alterations of the novel method and apparatus described herein may be made. It should be also appreciated that various omissions, replacements, and modifications may be made in the method and the apparatus described herein, without departing from the scope of the spirit of the technology. The technology is intended to include such modifications and alterations in so far as they fall within the scope of the appended claims or the equivalents thereof.

The computer 7C of the signal processor 7 and the power supply control device 8C of the optical filter corrector 8 illustrated in FIGS. 1 and 4 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the computer 7C of the signal processor 7 and the power supply control device 8C of the optical filter corrector 8. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the computer 7C of the signal processor 7 and the power supply control device 8C of the optical filter corrector 8 illustrated in FIGS. 1 and 4.

The invention claimed is:

1. An optical inspection system comprising:
    an optical fiber sensor configured to detect a vibration propagating in an inspection target object or a displacement of the inspection target object and to output a first optical signal having a temporal change in a wavelength, the temporal change in the wavelength corresponding to a temporal change in an amplitude of the vibration or a temporal change in the displacement;
    an optical filter configured to convert the first optical signal into a second optical signal having a temporal change in an intensity and to output the second optical signal, the temporal change in the intensity corresponding to the temporal change in the wavelength;

a signal processor configured to acquire inspection information on the inspection target object on a basis of the second optical signal;

a corrector configured to correct a correspondence relationship between the temporal change in the wavelength of the first optical signal and the temporal change in the intensity of the second optical signal by changing a wavelength characteristic of the optical filter, the correspondence relationship being directed to converting the first optical signal into the second optical signal; and a storage device configured to store information indicating a relationship between a temperature of the inspection target object and an amount of change in the wavelength characteristic of the optical filter, and wherein the corrector changes the wavelength characteristic of the optical filter by an amount of change corresponding to the temperature of the inspection target object.

2. The optical inspection system according to claim 1, wherein the optical filter comprises an arrayed waveguide grating, a fiber Bragg grating, or a phase-shifted fiber Bragg grating.

3. The optical inspection system according to claim 1, wherein the signal processor acquires, as the inspection information, information as to whether a defect is present in the inspection target object, or information indicating a degree of the defect present in the inspection target object, or both.

4. The optical inspection system according to claim 1, wherein
the optical filter includes an optical waveguide, and
the corrector changes the wavelength characteristic of the optical filter by adjusting a temperature of the optical waveguide.

5. An aircraft structure comprising the optical inspection system according to claim 1.

6. An optical inspection method comprising acquiring inspection information on an inspection target object by the optical inspection system according to claim 1.

7. The optical inspection system according to claim 1 wherein the signal processor configured to acquire inspection information on the inspection target object on the basis of the second optical signal includes circuitry configured to acquire the inspection information on the inspection target object on the basis of the second optical signal, and
the corrector includes circuitry that is configured to correct the correspondence relationship between the temporal change in the wavelength of the first optical signal and the temporal change in the intensity of the second optical signal by changing the wavelength characteristic of the optical filter, the correspondence relationship being directed to converting the first optical signal into the second optical signal.

8. The optical inspection system according to claim 1, wherein the optical filter comprises an arrayed waveguide grating.

9. An optical inspection system comprising:
an optical fiber sensor configured to detect a vibration propagating in an inspection target object or a displacement of the inspection target object and to output a first optical signal having a temporal change in a wavelength the temporal change in the wavelength corresponding to a temporal change in an amplitude of the vibration or a temporal change in the displacement;

an optical filter configured to convert the first optical signal into a second optical signal having a temporal change in an intensity and to output the second optical signal, the temporal change in the intensity corresponding to the temporal change in the wavelength;

a signal processor configured to acquire inspection information on the inspection target object on a basis of the second optical signal;

a corrector configured to correct a correspondence relationship between the temporal change in the wavelength of the first optical signal and the temporal change in the intensity of the second optical signal b changing a wavelength characteristic of the optical filter, the correspondence relationship being directed to converting the first optical signal into the second optical signal; and a storage device configured to store information indicating a relationship between an amount of strain in the inspection target object and an amount of change in the wavelength characteristic of the optical filter, and wherein the corrector changes the wavelength characteristic of the optical filter by an amount of change corresponding to the amount of strain in the inspection target object.

10. The optical inspection system according to claim 9, wherein the signal processor acquires, as the inspection information, an amount of strain in the inspection target object.

11. The optical inspection system according to claim 9, wherein
the optical filter includes an optical waveguide, and
the corrector changes the wavelength characteristic of the optical filter by causing the optical waveguide to expand or contract.

12. An aircraft structure comprising the optical inspection system according to claim 6.

13. An optical inspection method, comprising acquiring inspection information on an inspection target object by the optical inspection system according to claim 6.

14. The optical inspection system according to claim 9, wherein
the signal processor, that is configured to acquire inspection information on the inspection target object on the basis of the second optical signal, includes circuitry configured to acquire the inspection information on the inspection target object on the basis of the second optical signal, and
the corrector includes circuitry that is configured to correct the correspondence relationship between the temporal change in the wavelength of the first optical signal and the temporal change in the intensity of the second optical signal by changing the wavelength characteristic of the optical filter, the correspondence relationship being directed to converting the first optical signal into the second optical signal, and
wherein the signal processor acquires, as the inspection information, information as to whether a defect is present in the inspection target object, or information indicating a degree of the defect present in the inspection target object, or both.

15. The optical inspection system according to claim 9, wherein the optical filter comprises an arrayed waveguide grating.

16. An optical inspection system comprising:

an optical fiber sensor configured to detect a vibration propagating in an inspection target object or a displacement of the inspection target object and to output a first optical signal having a temporal change in a wavelength the temporal change in the wavelength corresponding to a temporal change in an amplitude of the vibration or a temporal change in the displacement;

an optical filter configured to convert the first optical signal into a second optical signal having a temporal change in an intensity and to output the second optical signal, the temporal change in the intensity corresponding to the temporal change in the wavelength;

a signal processor configured to acquire inspection information on the inspection target object on a basis of the second optical signal;

a corrector configured to correct a correspondence relationship between the temporal change in the wavelength of the first optical signal and the temporal change in the intensity of the second optical signal by changing a wavelength characteristic of the optical filter, the correspondence relationship being directed to converting the first optical signal into the second optical signal; and a storage device configured to store information indicating a relationship between a pressure to be exerted on a structure including the inspection target object and an amount of change in the wavelength characteristic of the optical filter, and wherein the corrector changes the wavelength characteristic of the optical filter by an amount of change corresponding to the pressure to be exerted on the structure.

17. An aircraft structure comprising the optical inspection system according to claim 16.

18. An optical inspection method comprising acquiring inspection information on an inspection target object by the optical inspection system according to claim 16.

19. The optical inspection system according to claim 16, wherein the signal processor, that is configured to acquire inspection information on the inspection target object on the basis of the second optical signal, includes circuitry configured to acquire the inspection information on the inspection target object on the basis of the second optical signal, and the corrector includes circuitry that is configured to correct the correspondence relationship between the temporal change in the wavelength of the first optical signal and the temporal change in the intensity of the second optical signal by changing the wavelength characteristic of the optical filter, the correspondence relationship being directed to converting the first optical signal into the second optical signal, and wherein the signal processor acquires, as the inspection information, information as to whether a defect is present in the inspection target object, or information indicating a degree of the defect present in the inspection target object, or both.

20. The optical inspection system according to claim 16, wherein the optical filter comprises an arrayed waveguide grating.

* * * * *